United States Patent [19]
Smith

[11] Patent Number: 5,873,271
[45] Date of Patent: Feb. 23, 1999

[54] TRAILER VEHICLE SECURITY DEVICE

[76] Inventor: Richard Smith, 27 Murray Island, Sylvania Waters, NSW, 2224, Australia

[21] Appl. No.: 793,361
[22] PCT Filed: Aug. 24, 1994
[86] PCT No.: PCT/AU94/00497
§ 371 Date: Apr. 24, 1997
§ 102(e) Date: Apr. 24, 1997
[87] PCT Pub. No.: WO96/05989
PCT Pub. Date: Feb. 29, 1996

[51] Int. Cl.$^6$ ..................................................... E05B 69/00
[52] U.S. Cl. .................................. 70/58; 280/507; 70/14; 70/232; 70/258; 70/DIG. 57
[58] Field of Search ................................ 70/232, 14, 258, 70/19, 58, 158, 163, 164, 166–169, 178, 229, 230, DIG. 57; 280/507, 511

[56] References Cited

U.S. PATENT DOCUMENTS

| | | | |
|---|---|---|---|
| 1,780,994 | 11/1930 | Caldwell | 70/178 |
| 2,094,773 | 10/1937 | Cohick | 70/178 |
| 2,571,349 | 10/1951 | Eckles . | |
| 3,759,076 | 9/1973 | Reese | 70/232 |
| 4,032,171 | 6/1977 | Allen et al. | 280/507 |
| 4,571,964 | 2/1986 | Bratzler | 70/58 |
| 4,730,841 | 3/1988 | Ponder | 70/258 |
| 4,774,823 | 10/1988 | Callison | 70/14 |
| 5,087,064 | 2/1992 | Guhlin | 280/507 |
| 5,195,339 | 3/1993 | Nee et al. | 70/14 |
| 5,222,755 | 6/1993 | O'Neal | 70/14 |
| 5,332,251 | 7/1994 | Farguhar | 70/14 |
| 5,378,008 | 1/1995 | McCrossen | 70/232 |

FOREIGN PATENT DOCUMENTS

| | | | |
|---|---|---|---|
| 2570991 | 4/1986 | France | 280/511 |
| 1206333 | 9/1970 | United Kingdom | 70/14 |
| 1334940 | 10/1973 | United Kingdom | 70/14 |

*Primary Examiner*—Darnell M. Boucher
*Attorney, Agent, or Firm*—Panitch Schwarze Jacobs & Nadel, P.C.

[57] ABSTRACT

A locking device for a trailer and hitch of the ball and socket type, comprising an upper jaw and a lower jaw interconnected together by a shaft for reciprocal movement relative to each other. A locking mechanism keeps the two jaws apart at fixed distances over a ribbed portion of the shaft. In use, the two jaws are locked about the socket portion of the hitch to prevent unauthorized removal of the trailer. When the trailer is attached to a tow vehicle, the tow ball nut is received in an opening in the lower jaw. When the trailer is unattached, a dummy ball extends into the socket of the hitch. In both position, the socket portion of the hitch is received in an aperture in the upper jaw.

6 Claims, 3 Drawing Sheets

TRAILER VEHICLE SECURITY DEVICE

This invention relates to devices for securing trailers and more particularly to devices for attachment to the hitch portion so a trailer.

Large trailers, such as those used for transporting boats, are expensive and thus liable to be stolen, particularly when unattached to a vehicle. However, even when attached to a vehicle, there is little to prevent unauthorised removal. Trailer locking devices have been proposed which either prevent unauthorised removal from a vehicle or attachment to a vehicle, ie they lock the trailer on the vehicle or of the vehicle. However, existing devices are not able to lock the trailer on and off the vehicle. Thus, it is necessary to have two separate locking devices or otherwise leave the trailer vulnerable to theft at some stage. Furthermore some trailer locks are not particularly secure.

In an attempt to provide an alternate lock to the prior art, the present invention provides a trailer lock which may, in preferred embodiments, lock the trailer when connected and disconnected from a tow vehicle. Accordingly, in one broad form the invention is a locking device for a trailer hitch of the ball and socket type, the locking device comprising an upper jaw and a lower jaw; shaft means interconnecting the two jaws together for reciprocal movement relative to each other; and, locking means for securing the two jaws at a selected distance apart wherein, in use, the jaws are lockable about the socket portion of the hitch to prevent unauthorised removal of the trailer.

Preferably, the locking device is lockable on the hitch when the trailer is both mounted on and dismounted from a tow bar on a tow vehicle.

Preferably, the locking device further includes an auxiliary locking member movable between first and second operative positions, whereby, in the first operative position, the device may be locked on to a hitch when attached to a tow bar, and in the second operative position, when locked to an unattached trailer hitch, the auxiliary locking member extends into the socket of the hitch.

More preferably, in the second operative position the auxiliary locking member is received in a recess or aperture in the lower jaw and extends toward the upper jaw.

In a preferred form, the recess or aperture is sized to receive a tow ball shaft and/or nut when the auxiliary locking member is in the first operative position.

In an alternate broad form, the invention provides a locking device for a trailer having first and second operative modes, in the first operative mode, the device being adapted to lock onto an unattached trailer hitch and prevent mounting of the hitch to a tow bar; and in the second operative mode the device being adapted to lock onto a trailer hitch/ tow bar when the trailer hitch is mounted on the tow bar and prevent removal of the hitch from the tow bar.

Preferably, in the first operative mode the device has an auxiliary member adapted to extend into the socket of the hitch.

The invention shall be better understood from the following description of a non-limiting embodiment and the drawings, in which.

Figure 1:
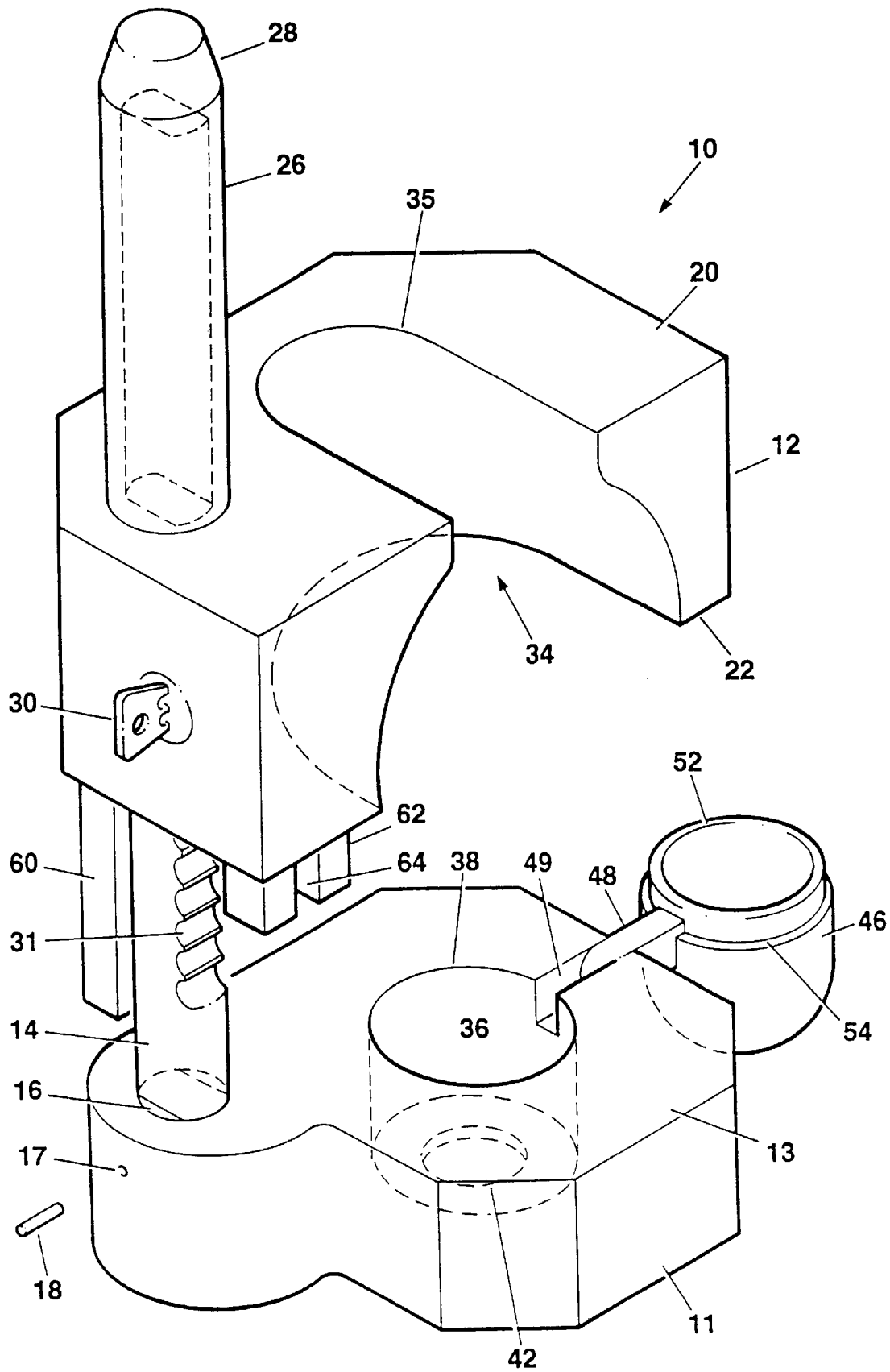
FIG. 1 shows a perspective view of an embodiment of the invention.

Referring to the drawings, the locking device 10 comprises a lower jaw 11 and an upper jaw 12. The lower jaw 11 has a generally planar upper surface 13. Extending upwardly from and substantially normally to the upper surface 13 there is provided a barbed shaft 14, preferably of a hardened steel.

The shaft 14 is received in a blind bore 16 in the lower jaw 11 and is secured thereto by any conventional means. This may be by way of a grub screw or lock pin 18, soldering, brazing or other known methods. Preferably, the shaft 14 is a press fit in bore 16 and is secured by a press fitted lock pin received in bore 17.

The upper jaw 12 is generally u-shaped with parallel planar upper and lower surfaces 20, 22 respectively. A bore 24 passes through the jaw normal to the upper and lower surfaces 20, 22. The free end of the shaft 14 is slidably received in this bore such that the two jaws, 11, 12 may be slid toward or away from each other. Securely mounted on the upper surface 20 and coaxial with the bore 24 there is provided a cylindrical cover member 26. The cover member 26 is closed at its free end 28 and is of a sufficient diameter and length to receive the portion of the shaft 14 which extends through the upper jaw 12. The cover member 28 prevents ingress of dirt and other contaminants into the bore 24 but is mainly to prevent tampering with the locking mechanism. Accordingly, it is preferably a steel cylindrical member. However, if tamper resistance is not required, it may be a rigid plastics or flexible rubber membrane.

The upper jaw 12 is provided with a keyed locking mechanism, generally indicated by 30. The locking mechanism comprises a keyed barrel rotatable between locked and unlocked positions. In the locked position a ball is urged toward the scallops 31 in the shaft 14 by means of a finger or cam mounted on the lock barrel, thereby preventing movement of the upper jaw 12 relative to the shaft and lower jaw 11.

As mentioned above, the upper jaw is unshaped and has a central aperture 34. The aperture is shaped to receive the tow-ball receiving portion of the trailer hitch, best seen in FIGS. 2 and 3. Accordingly, the lower portion of the aperture 34 is generally half circular in cross-section, with a narrow opening 35 into the upper surface 20. The narrow opening is to accommodate the normal ball securing mechanisms of the hitch which extend from the hitch housing.

Figure 2:
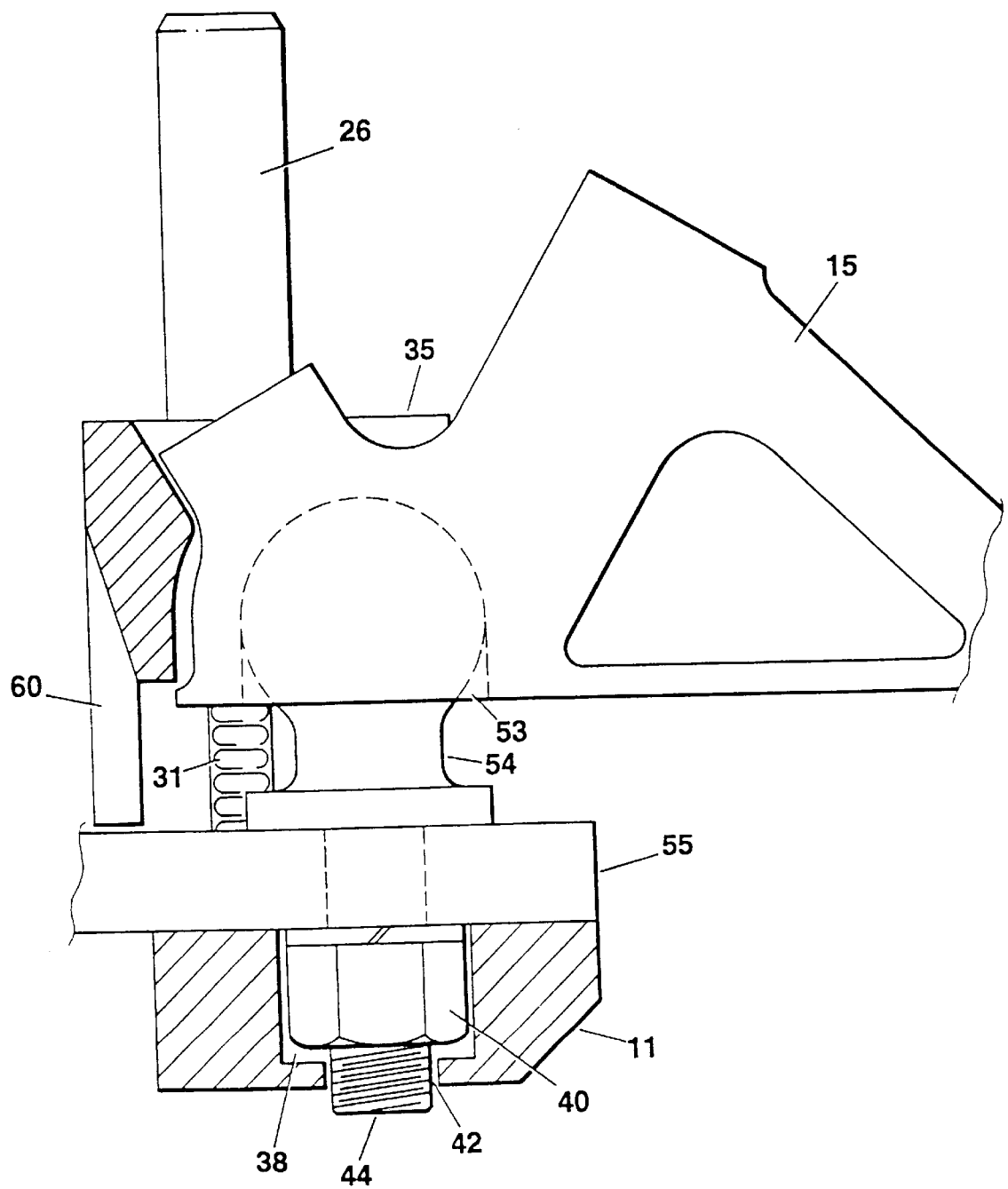
FIG. 2 shows a partial cross-section of the embodiment of FIG. 1 when in a configuration used to lock a trailer mounted on a tow vehicle's tow bar.

The lower jaw 11 is provided with an opening 36 in its upper surface 20 which preferably extends through the jaw. The opening 36 is provided with a large diameter bore 38 extending downwards from the upper surface. The bore 38 is of a sufficient depth and diameter to receive the tow ball nut 40. Although the opening 36 may comprise the bore 38 alone, preferably it comprises the bore 38 and a smaller diameter bore 42 sized smaller than the nut 40 but larger than the tow ball shaft 44. Thus, the shaft may extend through the jaw 11, as seen in FIG. 2. It will be appreciated that if the lower jaw 11 is of sufficient thickness a through opening is not necessary.

The lower jaw 11 is also provided with a "dummy ball" 46. The dummy ball 46 is preferably a hollow steel casting but may be a solid machined item, if desired. The ball 46 is pivotably attached to the jaw 11 by an arm 48 which is preferably integral with the ball 46.

The lower jaw 11 is provided with a slot 49 in which the free end of the arm 48 is journalled. The arm 48 is mounted in the slot 49 such that in one position, as in FIG. 1, the ball 46 is to one side of the jaw 11 and is mainly below the plane of the upper surface 13.

Figure 3:
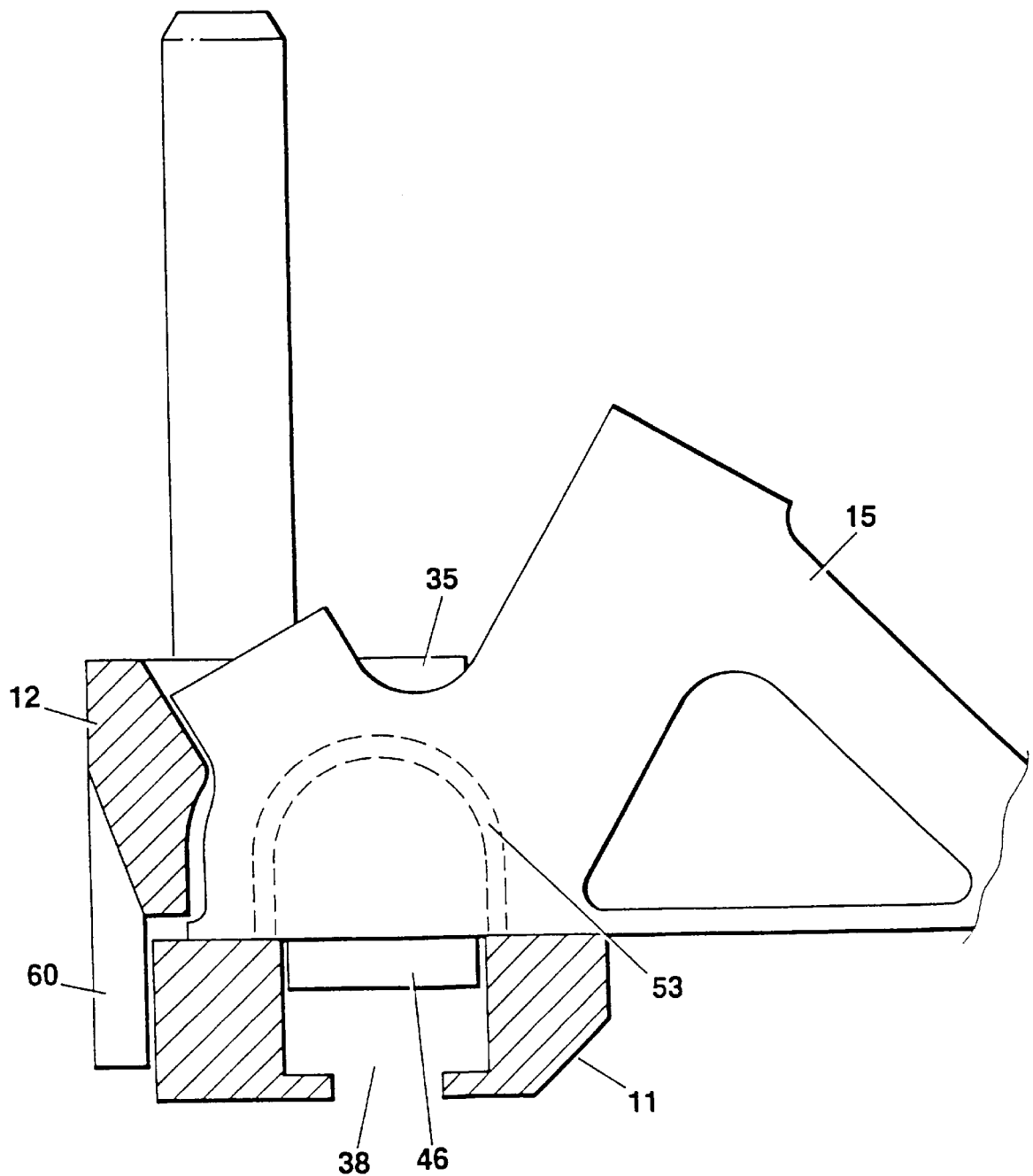
FIG. 3 shows a partial cross-section of the embodiment of FIG. 1 when in a configuration used to lock a trailer not attached to a tow vehicle.

The ball 46 may be pivoted 180 degrees, as in FIG. 3, such that it is engaged in bore 38 and mainly extends above the upper surface 13 toward the upper jaw 12. Preferably the ball is provided with a free end portion 52 of an outer diameter slightly less than the inside diameter of bore 38, so that the free end is snugly received in the bore. Preferably the remainder of the ball is of larger diameter, with a land 54 being formed to bear on the upper surface 13 and prevent over rotation of the ball 46. It will be appreciated that the arm 48 is not essential and other ways of moving/securing the dummy ball 46 may be utilised.

The locking device has two operative modes. In the first mode the dummy ball is rotated to the side of the jaw 11, as in FIG. 1. In this first mode the device may lock a trailer to a tow bar as in FIG. 2. In the second mode the dummy ball 46 is positioned in and coaxial with the bore 38 and the device may lock an unattached trailer.

The operation in the first mode will be explained with reference to FIG. 2.

The trailer hitch 15 is attached to the tow vehicle's tow ball, the tow ball 54 being secured in the part spherical opening 53 of the hitch 15. The device is unlocked and the two jaws 11, 12 are moved apart sufficiently that they may pass above and below the hitch and tow bar 55. The jaws must be separated sufficiently to allow the lower jaw to clear the tow bar, tow ball shaft 44 and nut 40. Usually the shaft 44 will extend downwardly the most.

The lower jaw is positioned to receive the tow ball shaft 44 and nut 40 and moved upwards to bear on the lower surface of the tow bar 55. Next, or simultaneously, the upper jaw 12 is moved towards the lower jaw until the hitch is received in the opening 34 between the two legs of the upper jaw. The lock 30 is then locked, securing the two jaws in position. It will be appreciated that once the two jaws are secured in position, the hitch cannot be removed from the tow ball 46. Thus the trailer cannot be disconnected from the tow vehicle. It will also be appreciated that removal of the tow ball nut 40 will not allow removal either, since the lower jaw bears on the tow bar 55. Further, the device cannot be shifted sideways off the hitch, since the tow ball shaft 44 will prevent this, even if the nut 40 is removed.

The operation in the second mode is best understood with reference to FIG. 3.

The jaws of the device are again unlocked and separated to pass over the unattached hitch 15.

The dummy ball 46 is positioned in the bore 38 and the lower jaw 11 and ball 46 positioned underneath the hitch. The jaw is raised upwards so the dummy ball 46 enters the ball receiving cavity 53 of the hitch. The upper jaw 12 is then moved downwards to again bear on the upper surfaces of the hitch 15. The locking mechanism 30 is then locked to secure the two jaws in position. In this position the device cannot be moved sideways because of the dummy ball 46 in the hitch cavity 53. Thus the trailer cannot be mounted on a tow bar and so cannot be towed away.

It will be appreciated that use of a dummy tow ball having a shape similar to that of a standard tow ball will reduce play when locked on an unattached trailer. However it will also be appreciated that the "ball" may merely be a protrusion extending into the hitch cavity to prevent substantial sideways movement.

In both modes removal is merely the reverse of the application steps.

The device is also provided with optional security measures to prevent tampering with the locking shaft 14.

As seen in FIG. 1, on either side of the shaft 14, the upper jaw has two downwardly extending tongues 60, 62, which serve to limit access to the bore in the upper jaw. If necessary the tongues may have cut-aways 64 to accommodate strengthening webs frequently found on tow bars.

It will be appreciated by those skilled in the art that many modifications and variations may be made to the embodiments described herein without departing from the spirit or scope of the invention.

I claim:

1. A locking device for a trailer hitch of a ball and socket type which includes a tow bar mounted on a tow vehicle, a ball including a threaded tow ball shaft connected to the ball passing through the tow bar and secured thereto by a tow ball nut, the locking device comprising:

upper jaw and lower jaw for locking about a socket portion of the hitch when the trailer is both attached and unattached to the tow bar on a tow vehicle to prevent unauthorized removal of the trailer, said lower jaw having an upper surface and recess means in the upper surface sized for receiving the tow ball nut and the tow ball shaft;

shaft means interconnecting the two jaws together for reciprocal movement relative to each other;

locking means for securing the two jaws at one of a plurality of positions at different distances apart; and an auxiliary locking means for extending into the socket of the hitch connected to the locking device, movable between first and second operative positions, whereby in the first operative position, the locking device may be locked on to the trailer hitch when attached to a tow bar with the tow ball nut and tow ball shaft extending into the recess means and with the upper jaw engaging an upper surface upon the hitch, and in the second operative position, when the locking device is locked to an unattached trailer hitch, with the upper jaw engaging an upper surface of the hitch and the auxiliary locking means on the lower jaw extending into the socket of the hitch.

2. The locking device of claim 1 wherein in the second operative position the auxiliary locking means is received in said recess means in the lower jaw and extends toward the upper jaw.

3. The locking device of claim 1 wherein the auxiliary locking means is pivotably mounted on the lower jaw.

4. The locking device of claims 1 wherein the upper jaw has a recess or aperture therein to receive a portion of the hitch.

5. The locking device of claims 1 wherein the shaft means comprises a single shaft securely mounted to one jaw and received in a through bore in the other jaw.

6. The locking device of claim 5 wherein the shaft comprises a ribbed or barbed shaft ad the locking means is mounted on or in the other jaw.

* * * * *